United States Patent Office 2,765,331
Patented Oct. 2, 1956

2,765,331

ESTERS OF PHOSPHORUS ACIDS AND PROCESS FOR THE PREPARATION OF THE SAME

Richard R. Whetstone and Denham Harman, Orinda, Calif., assignors to Shell Development Company, Emeryville, Calif., a corporation of Delaware No Drawing. Application February 29, 1952,
Serial No. 274,282

8 Claims. (Cl. 260—461)

This invention relates to a process for the production of esters of phosphorus acids, and it more particularly relates to a process for the production of esters of primary vinyl-type alcohols with the oxy-acids of pentavalent phosphorus. Novel esters of halogen-substituted primary vinyl-type alcohols with oxy-acids of pentavalent phosphorus form a further aspect of the invention. The application is a continuation-in-part of our copending applications Serial No. 60,174, filed November 15, 1948, now abandoned, and Serial No. 138,705, filed January 14, 1950, now abandoned, wherein the process of this invention was first disclosed and claimed by us.

We have discovered in accordance with the invention a new and advantageous method for the direct synthesis of esters of primary vinyl-type alcohols with the oxy-acids of pentavalent phosphorus. The new method leads to the formation of the desired vinyl-type esters in high yields and has the further advantage that the starting materials are readily available or can be easily prepared. The vinyl-type esters which can be prepared by the process are of interest as resin intermediates and as intermediates for the synthesis of other organic compounds containing phosphorus. Certain of the products which we have prepared by our new method are in themselves novel and useful. These new products form one of the aspects of the invention.

It has been discovered in accordance with the invention that alpha-monohalogeno-aldehydes, i. e., halogen-substituted aldehydes which have one and only one atom of halogen substituted on any one carbon atom which is adjacent to a formyl group, can be caused to react with neutral esters of oxy-acids of trivalent phosphorus. It has been further discovered that there can be produced directly by the reaction esters of primary vinyl-type alcohols with the oxy-acids of pentavalent phosphorus. The reaction, which is believed to be a new reaction, can be described generically by the following equation:

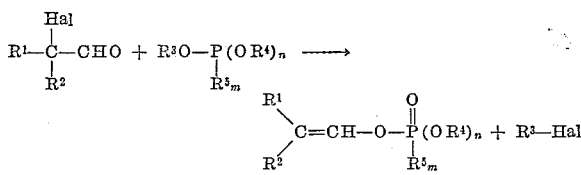

in which

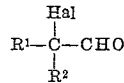

signifies the alpha-monohalogeno-aldehyde, particularly a lower alpha-monohalogeno-alkanal

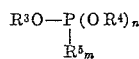

signifies the neutral ester of the oxy acid of trivalent phosphorus, and

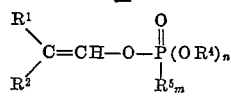

signifies the vinylic ester of pentavalent phosphorus which is obtained as product. Hal signifies halogen, i. e., iodine, bromine, or chlorine. In the above equation $R^3$—Hal represents organic halide which is formed as by-product. The method can also be employed where the phosphorus reactant is an ester of a polyhydric alcohol, e. g., when the radicals represented by $OR^3$ and $OR^4$ in the above formula of the phosphorus reactant are joined together to form the divalent radical

—O—$R^6$—O— of a 1,2- or 1,3-alkylene glycol. When such cyclic esters are employed the reaction differs superficially to the extent that by-product halogen ester is not necessarily separately evolved but may remain combined as a part of the phosphorus ester produced. This is illustrated by the following equation which describes the reaction between chloroacetaldehyde and 2-ethoxy-1,3,2-dioxaphospholane (ethyl 1,2-ethylene phosphite):

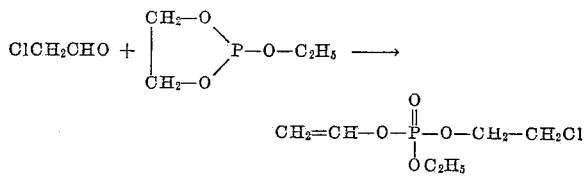

In the foregoing generic equation the alpha-monohalogeno aldehyde may be any aldehyde having one and only one atom of halogen substituted on the alpha carbon. $R^1$ and $R^2$ thus each represent hydrogen or an organic radical, such as an alkyl radical or a halogen-substituted alkyl radical, an aryl radical, or a cycloaliphatic radical. $R^3O$ represents the residue $R^3O$— of an alcohol $R^3OH$ and $R^4O$— represents the residue $R^4O$— of an alcohol or phenol $R^4OH$. $R^5$ represents an organic radical which is directly bonded to the phosphorus atom by a carbon-to-phosphorus bond and may be, for example, a hydrocarbon group, such as an alkyl, aryl, or cycloalkyl group. The letters $n$ and $m$ each represent one of the numbers 0, 1, and 2 with the proviso that $n+m=2$.

Illustrative alpha-monohalogeno-aldehydes which can be employed in the process of the invention include, without being limited to, the alpha-monohalogeno-alkanals, such as chloroacetaldehyde, bromoacetaldehyde, iodoacetaldehyde, alpha-bromopropionaldehyde, alpha-chloropropionaldehyde, alpha - bromoisobutyraldehyde, alpha-chloro-beta-ethylvaleraldehyde, and their homologs, and analogs; aryl-substituted alpha-monohalogeno-alkanals, such as beta-phenyl-alpha-chloropropionaldehyde, phenylchloroacetaldehyde, and beta-(p-chlorophenyl)-alpha-bromopropionaldehyde; cycloaliphatic alpha-monohalogeno-aldehydes, such as 1-bromocyclopentanal, beta-cyclohexyl-alpha-chloropropionaldehyde and beta - cyclopentyl - alpha - methyl - alpha - bromopropionaldehyde. A further group of alpha-monohalogeno-aldehydes which can be employed in the process of the invention include the halogen-substituted alkanals which contain a plurality of halogen substituents but which have one and only one atom of halogen substituted on the alpha carbon atom. The alpha-monohalogeno-aldehydes of this sub-group, from which novel products herein claimed are prepared, are illustrated by alpha,beta-dichloropropionaldehyde, alpha,beta-dibromopropionaldehyde, alpha,beta - dichloroisobutyraldehyde, alpha,beta-dichloro-alpha-ethyl caproic aldehyde, alpha, beta-dichloro-beta-phenylpropionaldehyde, alpha,beta-dichloro-beta-trichlorophenylpropionaldehyde, and alpha-gamma-dichlorobutyraldehyde. By reason of their generally greater availability the preferred alpha-monohalogeno-aldehydes are those which contain from two to twelve carbon atoms, although it will be understood that the operable limits of the invention extend to high molecular weight alpha-monohalogeno-aldehydes and the generic invention is not limited to this range.

As the neutral ester of trivalent phosphorous there can be employed a trialkyl phosphite, such as trimethyl phosphite, tributyl phosphite, triisopropyl phosphite, trioctyl phosphite, or, in fact, any trialkyl phosphite containing from 3 to 30 carbon atoms or more, and including mixed trialkyl phosphites, such as methyl ethyl propyl phosphite, as well as substituted trialkyl phosphites wherein the substituents are inert. Inert substituents include alkoxy, arylalkoxy, carboalkoxy, acyl, and acyloxy. Examples of neutral phosphites containing such inert substituents are tris-methoxyethyl phosphite, tris-carboisobutoxymethyl phosphite, tribenzyl phosphite, and tris-4-acetoxybutyl phosphite. Cyclic phosphites which may be employed equivalently include butyl 3-metoxy-1,2-propylene phosphite, ethyl 3-ethoxy-1,2-propylene phosphite, ethyl 1,3-butylene phosphite, and phenyl 3-methoxy-1,3-propylene phosphite, and homologous and analogous mixed phosphites or monohydric alcohols and 1,2- or 1,3-glycols. Corresponding phosphonites and phosphinites can be employed similarly and include those in which one or two, respectively, of the ester residues of the foregoing phosphites has been replaced by a hydrocarbon group, such as an alkyl or aryl group bonded to the phosphorus atom by a carbon-to-phosphorus bond, as in diethyl benzene phosphonite, diisobutyl benzene phosphonite, diethyl p-chlorobenzene phosphonite, ethyl dibutane phosphinite, and isopropyl dibenzene phosphinite.

It has been discovered in accordance with the invention that the new reaction can be effected by mixing the selected alpha-monohalogeno-aldehyde and the neutral ester of the acid of trivalent phosphorus and thereafter maintaining the mixture at reaction temperature. Reaction temperatures of from about 10° C. to 150° C. or more can be employed, optimum temperatures usually being within the range of from about 40° C. to about 90° C. The reactants are generally employed in about equimolar proportions. The mole ratio between the reactants may vary from unity, however, and mole ratios as high as 10:1, either reactant being in excess, may be employed. The reaction usually is exothermic. The reaction, which in some cases may tend to be violent, may be controlled and the temperature may be regulated by slow addition of one of the reactants to the total amount of the other reactant. Inert organic solvents or diluents, a hydrocarbon, an ether, or the like, including benzene, octane, dioxane, diamyl ether, xylene, etc., can be employed to dilute the reaction mixture and thereby facilitate control of an otherwise violent reaction. The reaction obviously may also be carried out while heating or cooling by external means as required. Reaction times of from as little as about ten minutes or an hour or two are in most cases sufficient for completion of the reaction. When the reaction is completed, the desired product can be recovered by conventional techniques, such as distillation, extraction, crystallization, or the like. Because of the high yields which are in many cases obtainable, separation of the desired ester of the primary vinyl-type alcohol from the crude reaction mixture is not always required for utility of the product and in such cases may be dispensed with.

The term vinyl-type alcohol is employed herein and in the appended claims to refer to the alcohols which, like and including vinyl alcohol, contain an olefinically unsaturated linkage in the alpha, beta position relative to the alcohol hydroxyl group. The term primary vinyl-type alcohol is used to refer to a vinyl-type alcohol wherein the alcoholic hydroxyl group and one hydrogen atom are the only atoms (other than the second olefinic carbon atom) which are directly bonded to the alpha olefinic carbon atom.

The following example is illustrative of the new reaction of this invention and of the process for effecting the new reaction.

*Example I*

To a three-necked glass flask equipped with a reflux condenser open at the top, a mechanical stirrer, and thermometer, there were charged 83 grams of triethyl phosphite. There then were added over a period of about one-half hour 39 grams of mono-chloro-acetaldehyde. During addition of the mono-chloro-acetaldehyde the temperature of the reaction mixture was maintained between 75° C. and 103° C. Evolved ethyl chloride was allowed to escape through the reflux condenser as formed. The resulting crude mixture was rapidly distilled with collection of 73 grams of product distilling between 83° C. and 98° C. under 10 mm. mercury pressure. The product was redistilled through a short packed column with separation of 61 grams of vinyl diethyl phosphate distilling between 85.2° C. and 88.8° C. under 10 mm. mercury pressure (about 80% of the fraction distilled between 86.8° C. and 88.8° C.). A sample of the vinyl diethyl phosphate was analyzed. Found: 39.6% C, 7.6% H, 17.8% P. Calculated: 40.01% C, 7.27% H, 17.20% P. A portion of the vinyl diethyl phosphate was heated on the steam bath with added benzoyl peroxide for about two hours. There was obtained a water-white viscous liquid polymer.

The following examples illustrate further the method of the invention. They also present selected specific embodiments showing the preparation of novel products of the invention.

*Example II*

Employing the apparatus described in the preceding example, 166 grams of triethyl phosphite were added to 127 grams of alpha, beta-dichloropropionaldehyde over a period of 1¾ hours. During addition of the triethyl phosphite the reaction mixture was vigorously stirred and the temperature was held at 20° C. to 30° C. by cooling as required. After all of the triethyl phosphite was added, the mixture was heated at 60° C. for one hour to drive off ethyl chloride formed as by-product. The crude mixture then was rapidly distilled to a kettle temperature of 130° C. under 0.7 mm. mercury pressure. There were obtained 41 grams of beta-chloromethylvinyl diethyl phosphate as a faintly yellow mobile liquid distillate having a refractive index of 1.4518 ($n$ 20/D). The beta-chloromethylvinyl diethyl phosphate was analyzed. Found: 15.1% Cl, 6.1% H, 34.9% C. Calculated: 15.51% Cl, 6.7% H, 37.77% C.

*Example III*

Employing the apparatus described in the preceding example, 80 grams of alpha, beta-dichloropropionaldehyde were slowly added to 276 grams of triethyl phosphite while the temperature of the mixture was held at 40° C. to 50° C. by cooling as required. The mixture then was heated over a period of two hours to a maximum temperature of 145° C. under about 15 mm. mercury pressure to vaporize ethyl chloride and unconsumed triethyl phosphite. The remaining 257 grams of reaction product were distilled under one mm. mercury pressure with collection of 137 grams distillate distilling between 50° C. and 146° C. The distillate was redistilled through a short packed column. There were collected 21 grams of beta-chloromethylvinyl diethyl phosphate distilling between 90° C. and 112° C. under less than one mm. mercury pressure. The beta-chloromethylvinyl diethyl phosphate was analyzed. Found: 37.14% C, 6.36% H, 13.7% P, 15.0% Cl. Calculated: 36.77% C, 6.17% H, 15.56% P, 15.51% Cl.

In place of the alpha,beta-dichloropropionaldehyde and trialkyl phosphite employed in Examples II and III there can be used other alpha-monohalogeno-aldehydes containing a plurality of atoms of halogen and other esters of phosphorous acid and esters of phosphonous and phosphinous acids to produce other new and useful esters of beta-haloalkyl vinyl alcohols with pentavalent oxy acids of phosphorus. The new products of the invention are characterized by the general structural formula:

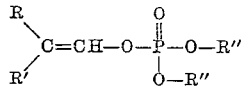

in which R represents a halogen-substituted alkyl radical, R' represents hydrogen, hydrocarbon or halogen-substituted hydrocarbon, and each R"O represents the residue R"O of an alcohol R"OH. The alcohol R"OH preferably is a monohydric unsubstituted aliphatic alcohol, such as methyl, ethyl, propyl, butyl, octyl, decyl, or other alkanol containing preferably from one to twelve carbon atoms. Illustrative of the novel beta-haloalkyl-vinyl dialkyl phosphates which can be prepared according to the method illustrated in Examples II and III and which form further specific embodiments of the invention are the following: beta-bromomethylvinyl dibutyl phosphate which can be prepared from alpha,beta-dibromopropionaldehyde and tributyl phosphite; beta-(2-chloroethyl)vinyl diisopropyl phosphate which can be prepared from alpha,gamma-dichlorobutyraldehyde and triisopropyl phosphite; beta - (2,2 - dichloroethyl)vinyl dimethyl phosphate which can be prepared from alpha,gamma,-gamma-trichlorobutyraldehyde and trimethyl phosphite; bis - methoxyethyl beta - chloromethyl - beta - methylvinyl phosphate which can be prepared from tris-methoxymethyl phosphite and alpha,beta-dichloroisobutyraldehyde; and beta-chloromethylvinyl 2-chloroethyl ethyl phosphate which can be prepared from ethyl 1,2-ethylene phosphite and alpha,beta-dichloropropionaldehyde; beta-chloromethylvinyl dioctyl phosphate which can be prepared from alpha,beta-dichloropropionaldehyde and trioctyl phosphite; beta-(2-chloroethyl)vinyl dibutyl phosphate, which can be prepared from alpha,gamma-dichlorobutyraldehyde and tributyl phosphite; beta-bromomethylvinyl dihexylphosphate which can be prepared from alpha,beta - dibromopropionaldehyde and trihexyl phosphite, and beta-bromomethyl-beta-phenylvinyl diethyl phosphate which can be prepared from alpha,beta-dibromo-alpha-phenylpropionaldehyde and triethyl phosphite.

The new products which are provided in accordance with this invention find particular utility as new and useful insecticides. They may be employed for purposes of eradicating insects and allied or similar animal organisms and for protecting against the ravages of such pests, either as the sole toxic agent or in conjunction with other, known toxic agents of either the naturally occurring or the synthetic varieties. Application as insecticides may be made either directly to the insect by customary techniques, such as spraying, dusting, or atomization, or the toxic agent may be applied by like techniques as to plants, animals, or fabricated structures which it is desired to protect against subsequent attack by such insects. The new toxic agents may also be applied as systemic poisons in agricultural uses, whereby the toxic agent is applied to the soil in the vicinity of the growing plant or directly to the plant and absorbed and translocated by the plant. The new toxic agents are characterized inter alia by high specific toxicity against insects and allied pests, by lasting action, and by desirable freedom from adverse effects upon plants to which they are applied for the purpose of protecting the plant against attack by insects.

It will be appreciated that the invention includes numerous specific embodiments and that it is intended to claim the invention with reference to the appended claims as broadly as the prior art permits.

We claim as our invention:

1. A process for the production of a vinyl dialkyl phosphate which comprises bringing 2-chloroethanal into intimate contact with a trialkyl phosphite.

2. A process for the production of an ester of a primary vinylic alcohol with a dialkyl phosphoric acid which comprises bringing an aldehyde having one, and only one, atom of halogen substituted in the alpha position into intimate contact with a trialkyl phosphite.

3. The process which comprises mixing 2-chloroethanal with a trialkyl phosphite at a controlled rate whereby the temperature of the mixture is maintained within the range of from about 10° C. to about 150° C. and recovering a vinyl dialkyl phosphate from the resulting mixture.

4. A process for the production of a beta-chloromethylvinyl dialkyl phosphate which comprises bringing alpha, beta-dichloropropionaldehyde into intimate contact with a trialkyl phosphite.

5. A process for the production of a neutral ester of a primary vinylic alcohol with an oxy acid of pentavalent phosphorus which comprises bringing an aldehyde having one, and only one, atom of halogen substituted in the alpha position into intimate contact with a neutral ester of an oxy acid of trivalent phosphorus.

6. Beta-chloromethylvinyl diethyl phosphate.

7. A beta-halomethylvinyl dialkyl phosphate in which each of the alkyl groups contains from 1 to 12 carbon atoms.

8. An ester of H₃PO₄ having a structure represented by the formula

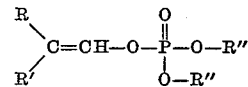

in which R represents a halogen-substituted alkyl radical containing from 1 to 4 carbon atoms, R' represents a member of the group consisting of hydrogen, alkyl, alkyl groups, said alkyl and halogen-substituted alkyl groups containing from 1 to 2 carbon atoms, and halogen-substituted hydrocarbon, and each R" represents an alkyl group containing from 1 to 12 carbon atoms.

References Cited in the file of this patent
UNITED STATES PATENTS

| 2,425,766 | Dock Fon Toy | Aug. 19, 1947 |
| 2,557,805 | Upson | June 19, 1951 |
| 2,573,568 | Harman et al. | Oct. 20, 1951 |
| 2,579,810 | Fields | Dec. 25, 1951 |
| 2,631,162 | Ladd et al. | Mar. 10, 1953 |